United States Patent
Song et al.

(10) Patent No.: US 8,861,378 B2
(45) Date of Patent: Oct. 14, 2014

(54) METHOD, SYSTEM AND NETWORK DEVICE FOR NODE CONFIGURATION AND PATH DETECTION

(75) Inventors: Jianmin Song, Shenzhen (CN); Peng Ma, Shenzhen (CN); Dapeng Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 13/330,367

(22) Filed: Dec. 19, 2011

(65) Prior Publication Data

US 2012/0087251 A1    Apr. 12, 2012

Related U.S. Application Data

(63) Continuation of application No. PCT/CN2010/075452, filed on Jul. 26, 2010.

(30) Foreign Application Priority Data

Jul. 28, 2009  (CN) .......................... 2009 1 0164972

(51) Int. Cl.
*H04L 12/28* (2006.01)
*H04L 1/00* (2006.01)
*H04L 12/751* (2013.01)
*H04L 12/18* (2006.01)
*H04L 12/24* (2006.01)
*H04L 12/761* (2013.01)
*H04L 12/721* (2013.01)

(52) U.S. Cl.
CPC .............. *H04L 41/0873* (2013.01); *H04L 45/16* (2013.01); *H04L 45/02* (2013.01); *H04L 45/26* (2013.01); *H04L 12/18* (2013.01); *H04L 45/34* (2013.01)
USPC .......................................... 370/248; 370/254

(58) Field of Classification Search
CPC ........... H04J 3/14; H04L 43/50; H04L 45/00; H04L 43/00; H04L 12/26; H04L 45/16
USPC ................................... 370/248, 351
See application file for complete search history.

(56) References Cited

U.S. PATENT DOCUMENTS 6,023,455 A * 2/2000 Takahashi ...................... 370/249
6,426,963 B1 * 7/2002 Kim ............................... 370/524
(Continued)

FOREIGN PATENT DOCUMENTS

| CN | 1909503 A | 2/2007 |
| CN | 101159688 A | 4/2008 |

(Continued)

OTHER PUBLICATIONS

Office Action issued in corresponding European Patent Application No. 10803896.9, mailed Jul. 23, 2013, 5 pages.

(Continued)

*Primary Examiner* — Warner Wong
(74) *Attorney, Agent, or Firm* — Brinks Gilson & Lione

(57) ABSTRACT

A method, system, and network device for node configuration and path detection are provided. The method for path detection includes: receiving a path detection message, and writing path state information of a present node into the path detection message; forwarding the path detection message, into which the path state information of the present node has been written, to downstream nodes according to a forwarding manner for a multicast data stream. The method for path detection is capable of improving the acquisition efficiency for multicast paths and saving network bandwidth.

7 Claims, 5 Drawing Sheets

(56) References Cited

U.S. PATENT DOCUMENTS

| | | | |
|---|---|---|---|
| 6,538,997 B1* | 3/2003 | Wang et al. | 370/241 |
| 7,016,351 B1 | 3/2006 | Farinacci et al. | |
| 7,843,838 B1* | 11/2010 | Huang et al. | 370/241.1 |
| 8,310,941 B2* | 11/2012 | Saltsidis | 370/242 |
| 8,547,981 B2* | 10/2013 | Wood | 370/400 |
| 2004/0218542 A1* | 11/2004 | Lee | 370/248 |
| 2005/0053006 A1* | 3/2005 | Hongal et al. | 370/236.2 |
| 2005/0094568 A1* | 5/2005 | Judd | 370/242 |
| 2005/0099948 A1* | 5/2005 | Wakumoto et al. | 370/236 |
| 2006/0191331 A1* | 8/2006 | Tubb et al. | 73/146.8 |
| 2006/0221844 A1* | 10/2006 | Subramanian et al. | 370/248 |
| 2007/0025241 A1* | 2/2007 | Nadeau et al. | 370/229 |
| 2007/0025277 A1 | 2/2007 | Sajassi et al. | |
| 2007/0097945 A1 | 5/2007 | Wang et al. | |
| 2008/0080501 A1 | 4/2008 | Damm | |
| 2008/0080507 A1 | 4/2008 | Swallow et al. | |
| 2008/0298258 A1 | 12/2008 | Susilo et al. | |
| 2008/0310340 A1* | 12/2008 | Isozu | 370/328 |
| 2009/0168663 A1* | 7/2009 | Friskney et al. | 370/254 |
| 2009/0297141 A1* | 12/2009 | Amano et al. | 398/17 |
| 2010/0238791 A1* | 9/2010 | Duncan et al. | 370/216 |
| 2010/0271960 A1* | 10/2010 | Krygowski | 370/248 |
| 2011/0235638 A1* | 9/2011 | Tempia Bonda | 370/390 |
| 2014/0003430 A1* | 1/2014 | Arberg et al. | 370/390 |

FOREIGN PATENT DOCUMENTS

| | | |
|---|---|---|
| CN | 101207537 A | 6/2008 |
| CN | 101360046 A | 2/2009 |
| EP | 2075958 A1 | 7/2009 |
| JP | 2007243481 A | 9/2007 |
| WO | WO 2009062439 A1 | 5/2009 |

OTHER PUBLICATIONS

Extended European Search Report issued in corresponding European Patent Application No. 10803896.9, mailed Jan. 11, 2012.

International Search Report issued in corresponding PCT Patent Application No. PCT/CN2010/075452, mailed Nov. 4, 2010.

Written Opinion of the International Searching Authority issued in corresponding PCT Patent Application No. PCT/CN2010/075452, mailed Nov. 4, 2010.

Fenner, "A "Traceroute" Facility for IP Multicast" Internet Engineering Task Force, Feb. 11, 2005.

Varga et al., "Integration of Service-Level Monitoring with Fault Management for End-to-End Multi-Provider Ethernet Services" IEEE Transactions on Network and Service Management, vol. 4, No. 1, Jun. 2007.

Office Action issued in corresponding Chinese Patent Application No. 200910164972.3, mailed Mar. 12, 2012.

* cited by examiner

METHOD, SYSTEM AND NETWORK DEVICE FOR NODE CONFIGURATION AND PATH DETECTION

CROSS-REFERENCE TO RELATED APPLICATIONS

This application is a continuation of International Application No. PCT/CN2010/075452, filed on Jul. 26, 2010, which claims priority to Chinese Patent Application No. 200910164972.3, filed on Jul. 28, 2009, both of which are hereby incorporated by reference in their entireties.

FIELD

The present disclosure relates to the field of network communications technology, in particular, to a method, system and network device for path detection and node configuration.

BACKGROUND

In multicast service, path discovery for multicast are mostly implemented according to control layer protocols, that is, the path discovery for multicast are generally implemented through multicast routing, instead of paths through which actual multicast data streams pass. In some cases, the multicast routing is not necessarily consistent with the multicast data stream, and therefore, it is required to perform detection on multicast paths according to actual multicast data streams.

In the prior art, a multicast path detection method is provided. As shown in FIG. 1, a multicast network includes Maintenance association End Point (MEP) MEP1, MEP2, and MEP3, and Maintenance association Intermediate Point (MIP) MIP1 and MIP2. MEP1 is a source MEP, and MEP2 and MEP3 are target MEPs. The source Maintenance association End Point MEP1 sends a Link Trace Message (LTM) to the target maintenance association end point MEP2, and the LTM message carries a physical address of MEP2. After receiving the message, the target maintenance association end point MEP2 and the maintenance association intermediate point MIP1, through which the LTM message passes, send a Link Trace Reply (LTR) message to the source maintenance association end point MEP1, and the source maintenance association end point MEP1 determines a path to the target maintenance association end point according to the received LTR message.

In the prior art, the path detection method can only detect the multicast path leading from the source maintenance association end point MEP1 to one target maintenance association end point MEP each time, and cannot detect the multicast paths leading from the source maintenance association end point to multiple target maintenance association end points at the same time.

SUMMARY

Embodiments of the present disclosure provide a method and system for path detection, a method and network device for node configuration, which are capable of obtaining multicast paths leading from one source MEP to multiple target MEPs at the same time.

An embodiment of the present disclosure provides a method for path detection, which includes: receiving, in a network device having a processor, a path detection message, writing path state information of a present node into the received path detection message; and forwarding the path detection message to downstream nodes according to a forwarding manner for a multicast data stream.

An embodiment of the present disclosure provides a method for node configuration, which includes: receiving a path detection message; creating a configuration check message according to path state information carried in the path detection message, where the configuration check message carries multicast data stream identification (ID) and node ID of target nodes which need to be configured; and sending the configuration check message to the target nodes which need to be configured.

An embodiment of the present disclosure further provides a method for node configuration, which includes: receiving a configuration check message, where the configuration check message carries a multicast data stream ID and node IDs of target nodes which need to be configured; configuring an interface state of a present node according to the multicast data stream ID in the configuration check message; determining whether the present node is the last target node which needs to be configured in the configuration check message, if the present node is the last target node which needs to be configured in the configuration check message, terminating the configuration check message; otherwise forwarding the configuration check message to a next target node according to the node IDs of the target nodes carried in the configuration check message.

An embodiment of the present disclosure provides a system for path detection, which includes: a source node, configured to multicast a path detection message to a target node; an MIP, configured to receive the path detection message, write path state information of a present node into the path detection message, and forward the path detection message, into which the path state information of the present node has been written, to downstream nodes according to a forwarding manner for a multicast data stream; and a target node, configured to receive the path detection message, into which the path state information of the MIP has been written, and obtain a multicast path according to the path state information of the MIP.

An embodiment of the present disclosure further provides a network device, which includes: a detection message receiving unit, configured to receive a path detection message; a path writing unit, configured to write path state information of a present node into the path detection message; and a detection message sending unit, configured to forward the path detection message, into which the path state information of the present node has been written, to downstream nodes according to a forwarding manner for a multicast data stream.

An embodiment of the present disclosure further provides a network device, which includes: a check message receiving unit, configured to receive a configuration check message, where the configuration check message carries a multicast data stream ID and node IDs of target nodes which need to be configured; an interface configuring unit, configured to configure an interface state of a present node according to the multicast data stream ID in the configuration check message; a first determining unit, configured to determine whether the present node is the last target node which needs to be configured in the configuration check message; a check message terminating unit, configured to terminate the configuration check message when the determining unit determines that the present node is the last target node which needs to be configured in the configuration check message; and a check message forwarding unit, configured to forward the configuration check message to a next target node according to IDs of target nodes carried in the configuration check message when the determining unit determines that the present node is not the last target node which needs to be configured in the configuration check message.

An embodiment of the present disclosure further provides network device, which includes: a first receiving unit, configured to receive a path detection message; a check message creating unit, configured to create a configuration check message according to path state information carried in the path detection message, where the configuration check message carries a multicast data stream ID and node IDs of target nodes which need to be configured; and a first sending unit, configured to send the configuration check message to the target nodes which need to be configured.

In the embodiments of the present disclosure, the source node multicasts the path detection message to a plurality of target nodes; the MIP, through which the path detection message passes, writes the path state information of the MIP into the path detection message after receiving the path detection message, and then forwards the path detection message to downstream nodes according to a forwarding manner for a multicast data stream. The target nodes capable of receiving the multicast data stream can receive the path detection message, and obtain their respective multicast paths according to the path state information carried in the path detection message. As compared with the prior art, in the embodiments of the present disclosure, the source node may obtain the multicast paths leading from the source node to multiple target nodes by sending the path detection message once. Therefore, the embodiments of the present disclosure can improve the acquisition efficiency of the multicast paths and save network bandwidth.

DETAILED DESCRIPTION OF THE EMBODIMENTS

Embodiments of the present disclosure provide a method for path detection and a method for node configuration, and further provide embodiments of corresponding system and device, which are illustrated in detail in the following.

Figure 1:
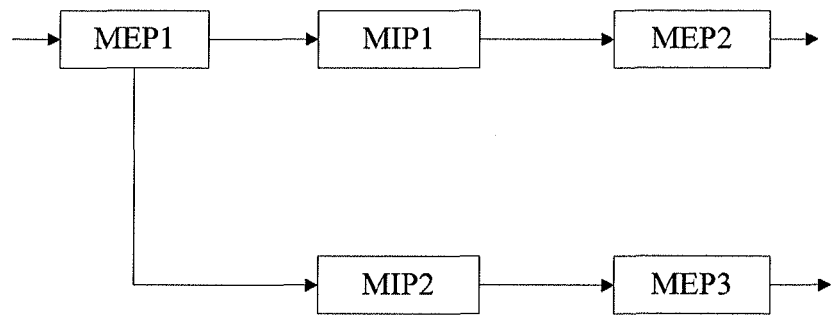
FIG. 1 is a scenario diagram of a method for path detection in the prior art.
Figure 2:
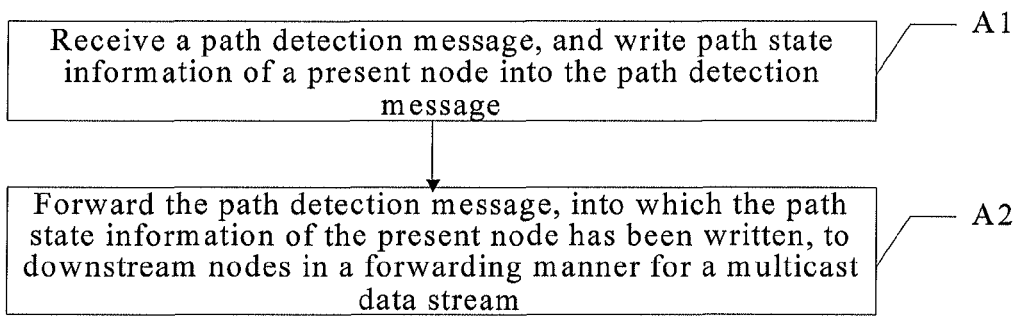
FIG. 2 is a flow chart of a first embodiment of a method for path detection according to an embodiment of the present disclosure.

FIG. 2 is a flow chart of a first embodiment of a method for path detection according to an embodiment of the present disclosure. Referring to FIG. 2, the method specifically includes the following steps.

Step A1: Receive a path detection message, and write path state information of a present node into the path detection message.

In the embodiment of the present disclosure, the path detection message sent by a source node to target nodes is forwarded by an MIP. After receiving the path detection message, the MIP writes path state information of the MIP into the path detection message.

The path state information may include information such as a node ID of the present node and interface states of an ingress interface and an egress interface of the present node. The path detection message may include a path state table, where the path state table stores path state information of the MIP and the source node.

Step A2: Forward the path detection message, into which the path state information of the present node has been written, to downstream nodes in a forwarding manner for a multicast data stream.

The path detection message received by the MIP is a multicast data message, and the MIP forwards the path detection message, into which the path state information of the present node has been written, to downstream nodes in a forwarding manner for a multicast data stream.

In the embodiment of the present disclosure, the MIPs may forward the path detection message, into which the path state information of the present node has been written, to downstream nodes according to a Multicast Forwarding Information Base (MFIB). It should be noted that, the forwarding the path detection message to the downstream nodes according to the MFIB is only one of the forwarding manners, and the MIPs may also forward the path detection message according to other forwarding manners for the multicast data stream.

In the embodiment of the present disclosure, all the MIPs, through which the path detection message passes, perform the above steps until the path detection message is sent to the target nodes. The path state information of each MIP may be written in sequence, or the path state information of each interface may be encoded and written into the path detection message in any agreed format.

In the embodiment of the present disclosure, the MIP may write the path state information of the present node into a load field of the path detection message, and definitely, the field, into which the path state information of the present node could be written into, is not limited to the load field, and other fields also apply.

In the embodiment of the present disclosure, the MIP, through which the path detection message passes, writes the path state information of the MIP into the path detection message after receiving the path detection message, and then forwards the path detection message to downstream nodes according to a forwarding manner for the multicast data stream. Accordingly, the target nodes capable of receiving the multicast data stream may receive the path detection message, and obtain their respective multicast paths according to the path state information carried in the path detection message. As compared with a multicast path detection method in which an LTM message can only be sent to one target node in the prior art, in the embodiment of the present disclosure, the path detection message is forwarded on a forward layer according to a forwarding manner for the multicast data stream, thereby improving the acquisition efficiency for multicast paths and saving network bandwidth.

In the embodiment of the present disclosure, after receiving path detection message, the MIP may further save the path state information carried in the path detection message, so that when locally detecting that a multicast path changes upon receiving the path detection message next time, the MIP may send a path detection request message to the source node, so as to request a multicast path detection procedure.

In the embodiment of the present disclosure, the source node may determine the multicast data stream requiring path detection, extract a multicast data message requiring path detection, modify the multicast data message to a path detection message, so that the target node or the MIP may identify the path detection message from the multicast data stream. The source node may modify a protocol number field of the multicast data message, and definitely, other identifying methods can also be used. In addition, the source node may also write path state information of the source node into a load field of the path detection message.

Referring to Table 1, the path detection message provided in the embodiment of the present disclosure may be in a fixed format.

TABLE 1

| Level | Version | Operation type | Sending period | TLV offset |
|---|---|---|---|---|
| | | Serial Number | | |
| | | Path Detection TLV1 | | |
| | | Path Detection TLV2 | | |
| | | ... | | |
| TLV End Mart | | | | |

As shown in Table 1, the path detection message may include the following contents.

Operation type is for indicating that the type of the message is the path detection message. Sending period is used for informing a sending period of a measurement message, or a predetermined number of data packets to be sent during a fixed packet sending, that is, the number of data packets required to be spaced during the fixed packet sending. Path detection Type Length Value (TLV) is used for recording information when the path detection message passes through the node, which includes, but is not limited to, IP, ID, MEP/MIP configuration state, and a node type. Type is used for indicating that the type of the message is the path detection message. Length is used for indicating the length of data in the message, counted in bytes.

In the embodiment of the present disclosure, the configuration states of the interface may include: MEP, MIP, NULL, and TRANSPARENT, where:

MEP represents that the interface has been configured with the MEP of the multicast data stream;

MIP represents that the interface has been configured with the MIP of the multicast data stream;

NULL represents that the interface has not been configured with any role of the multicast data stream; and TRANSPARENT represents that an Operation, Administration and Maintenance (OAM) message are processed transparently on the present interface.

The path state information of each MIP may be written in sequence, or the path state information of each interface may be encoded and written into the path detection message in any agreed format.

The path detection message may further include: TLV (Type Length Value) offset, for indicating a position of the TLV in the message, where the TLV is used for expansion of future functions; Serial number, for indicating an order for a MEP_I node to send a measurement message; and TLV end mark, for indicating that the TLV ends, where if a network device encounters this mark, it indicates the end of all TLVs.

In the embodiment of the present disclosure, the path detection TLV field may include:

| Type | Length | Value |
|---|---|---| where, the type, length, and value in the path detection TLV field may be set according to requirements. For example, Type=3 represents data TLV; Length=5 (4-byte IP address+1 byte state ID); Value=interface IP (ID)+MIP/MEP state ID+node type.

Referring to Table 2, the TLV format of the path detection message provided in the embodiment of the present disclosure is shown.

TABLE 2

| Type | Length | Level | Version | Sending period |
|---|---|---|---|---|
| | | Serial number | | |
| | | IP1 | | State 1 |
| | | IP2 | | State 2 |
| | | ... | | ... |

In the path detection message in the TLV format, the IP field is used for indicating an IP address of the interface, the state field is used for indicating the configuration state of the interface, and other fields in the path detection message of the TLV format are the same as those in the path detection message of the fixed format.

Figure 3:
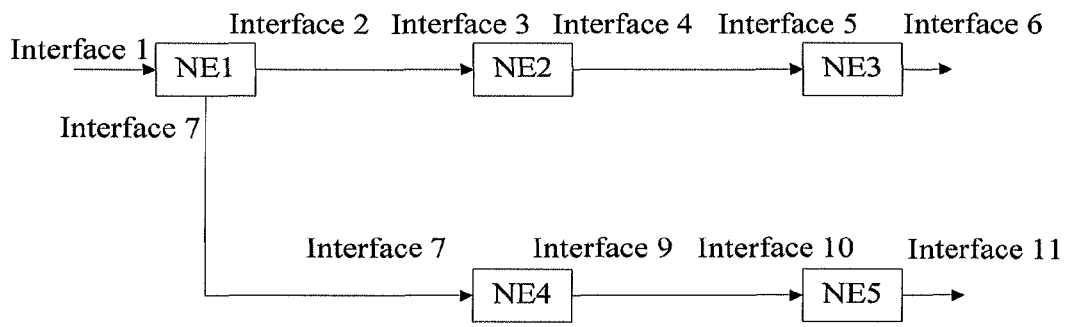
FIG. 3 is an application scenario diagram of a method for path detection according to an embodiment of the present disclosure.

For understanding the embodiment of the present disclosure in detail, a specific application scenario of the method for path detection according to the embodiment of the present disclosure is described in the following. Referring to FIG. 3, an application scenario diagram of a method for path detection according to an embodiment of the present disclosure is shown. In this application scenario, a MEP-I node is configured at an ingress interface of a measurement source device NE1, and a MEP-E node is configured respectively at egress interfaces of destination devices NE3 and NE5. Definitely, the MEP-I node may also be configured at an egress interface of the measurement source device, and the MEP-E node is configured respectively at ingress interfaces of the destination device.

In this application scenario, the source measurement point is a MEP-I node, an intermediate measurement point is an MIP node, and a target measurement node is a MEP-E node. An interface 1 of the network device NE1 is a MEP-I node. Interfaces 3 and 4 of the network device NE2, an interface 5 of the network device NE3, interfaces 8 and 9 of the network device NE4, and an interface 10 of the network device NE5 are all MIP nodes. An interface 6 of the network device 3 and an interface 11 of the network device 5 are both MEP-E nodes.

Figure 4:
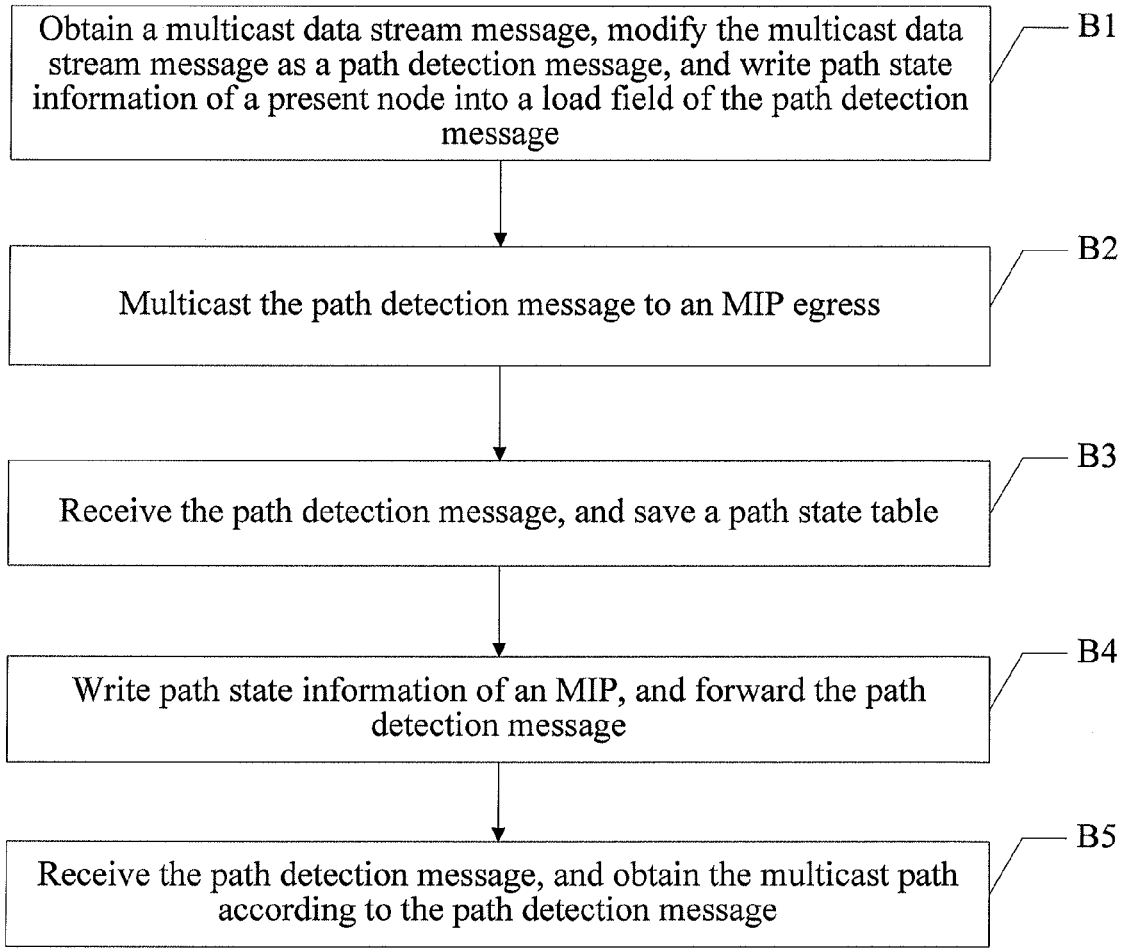
FIG. 4 is a flow chart of a second embodiment of a method for path detection according to an embodiment of the present disclosure.

FIG. 4 is a flow chart of a second embodiment of a method for path detection according to an embodiment of the present disclosure. Referring to FIG. 4, in this application scenario, the second embodiment of the method for path detection may include the following steps.

Step B1: A MEP ingress obtains a multicast data stream message, modifies the multicast data stream message into a path detection message, and writes path state information of the present node into a load field of the path detection message.

In the embodiment of the present disclosure, the network device NE1 obtains the multicast data stream message from the MEP ingress, and modifies the multicast data message into the path detection message, for example, modifies a protocol number field of the multicast data message, and definitely, may also modify other fields of the multicast data message or use other identifying methods to identify the path detection message. The network device NE1 also obtains the path detection message by writing the path state information of the present interface into the load field of the path detection message. In addition, the path detection message may include a path state table, which is used for storing the path state information of nodes on the multicast paths.

Step B2: Multicast the path detection message to a MEP egress.

In the embodiment of the present disclosure, the network device NE1 multicasts the path detection message to the interface 6 of the network device NE3 and the interface 11 of the network device NE5.

Step B3: Receive the path detection message, and save the path state table.

In the embodiment of the present disclosure, the network devices NE2 and NE4 may locally save the path state table of the path detection message after receiving the path detection message, so that when locally detecting that the multicast path has changed upon receiving the path detection message the next time, the network devices may initiate a path detection request message to the MEP ingress to request a multicast path detection procedure.

Step B4: Write the path state information of the MIP, and forward the path detection message.

In the embodiment of the present disclosure, the network device NE2 may write the path state information of the interface 3 and the interface 4 into the path state table of the path detection message after receiving the path detection message, and then forward the path detection message, into which the path state information of the MIP has been written, to a next hop network device (NE3) from the interface 4 according to the MFIB. After receiving the path detection message, the network device NE3 writes the path state information of the interface 5 into the path detection message, and then forwards the path detection message to the interface 6 according to the MFIB.

The network device NE4 writes the path state information of the interface 8 and the interface 9 into the path state table of the path detection message after receiving the path detection message, and then forwards the path detection message, into which the path state information of the MIP has been written, to a next hop network device (NE5) from the interface 9 according to the MFIB. After receiving the path detection message, the network device NE5 writes the path state information of the interface 10 into the path detection message, and then forwards the path detection message to the interface 11 according to the MFIB.

In the embodiment of the present disclosure, the path state information may include information such as IP addresses of the interfaces, IDs of the network device, and states of the interfaces.

Step B5: Receive the path detection message, and obtain the multicast path according to the path detection message.

In the embodiment of the present disclosure, the MEP egresses MEP-Es (interfaces 6 and 11) obtain the multicast paths according to the path state table in the received path detection message, add the path state information of the present node, and locally save the path state information in the form of a list.

In the embodiment of the present disclosure, a topology structure of a network may be analyzed according to the multicast paths obtained by all the MEP-E nodes. Compared with the prior art in which the path detection method needs to send the LTM message to multiple target nodes for several times to obtain the multicast paths, the embodiment of the present disclosure provides a method for path detection based on the multicast data stream, in which the path detection message is forwarded according to a forwarding manner for the multicast data stream when being forwarded by the MIPs. In the embodiment of the present disclosure, the MEP ingress may obtain the multicast paths from the MEP ingress to all MEP egresses by sending the path detection message to the MEP egresses once, thereby improving the acquisition efficiency for the multicast paths and saving the network bandwidth.

Specific embodiments of a method for node configuration according to an embodiment of the present disclosure are described in the following.

Figure 5:
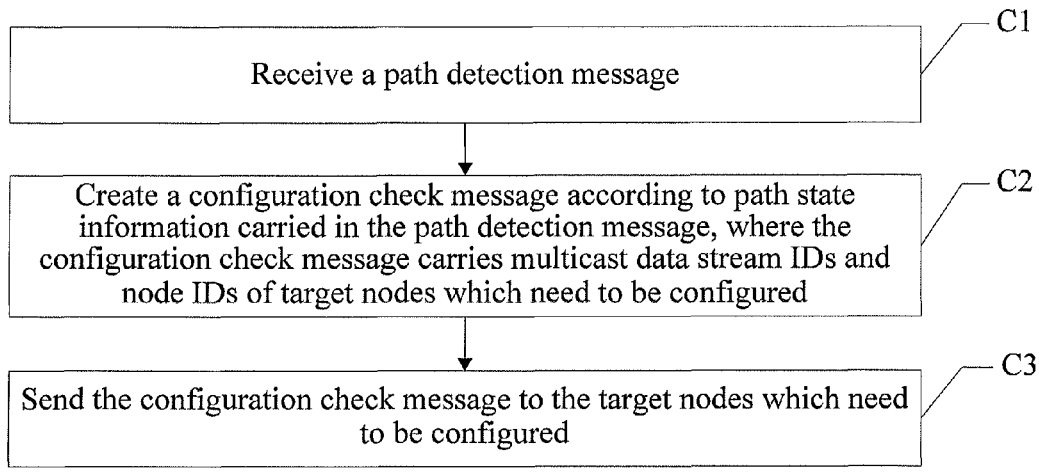
FIG. 5 is a flow chart of a first embodiment of a method for node configuration according to an embodiment of the present disclosure.

FIG. 5 is a flow chart of a first embodiment of a method for node configuration according to an embodiment of the present disclosure. Referring to FIG. 5, the method includes the following steps.

Step C1: Receive a path detection message.

In the embodiment of the present disclosure, the MEP egress receives the path detection message forwarded by the MIP, where the path detection message carries the path state information.

Step C2: Create a configuration check message according to the path state information carried in the path detection message, where the configuration check message carries a multicast data stream ID and node IDs of target nodes which need to be configured.

In the embodiment of the present disclosure, the MEP egress may create the configuration check message according to the path state information, where the configuration check message may be a unicast OAM message or a unicast message of another type, so as to facilitate the target nodes to identify the configuration check message. Destination addresses in the configuration check message are IP addresses of the target nodes which need to be configured in the path state table, and the configuration check message carries IDs (S, G) of multicast data streams and IP addresses of the target nodes which need to be configured. Optionally, the IP addresses of the target nodes which need to be configured may be saved in the path state table of the configuration check message.

Step C3: Send the configuration check message to the target nodes which need to be configured.

In the embodiment of the present disclosure, the MEP egress may send the configuration check message to the target nodes which need to be configured.

After receiving the configuration check message, the target node configures the interface state according to the configuration check message, and then sends the configuration check message to the next target node. The next target node completes the interface state configuration according to the configuration check message. Therefore, the embodiment of the present disclosure may implement automatic configuration of interface states of all the target nodes.

In the embodiment of the present disclosure, the MEP egress may also determine whether the path state information in the path detection message is the same as the locally saved path state information after receiving the path detection message. If the path state information in the path detection message is different from the locally saved path state information, it indicates that there are MIPs which need to be configured on the multicast path, and the step of creating the configuration check message according to the path state information carried in the path detection message by the MEP egress is triggered.

In the embodiment of the present disclosure, the MEP egress may send the configuration check message in the following situations:

1) IP/ID lists in the path state table are different, including newly added items or deleted items or changed items, which indicates that nodes are added, deleted, or changed;

2) IP/ID lists in the path state table are the same, but have different configuration states, including adding, deleting, and changing;

3) initial state, where a local path state list is NULL.

In the embodiment of the present disclosure, if the first MIP which needs to be configured is located on the same network device with the MEP egress, the configuration is directly accomplished at the interface which needs to be configured, and the configuration check message, which has the IP address of the interface as the source address and the IP address of a next interface which needs to be configured in the path state list as the destination address and carries the multicast data stream ID (S, G) and the refreshed path state table, is sent in a unicast message manner.

In the embodiment of the present disclosure, the format of the configuration check message may be the fixed format 1 shown in Table 3 or the TLV format shown in Table 4, and the configuration check message may include the following contents.

Operation type, used for indicating the type of the message is the configuration check message. Sending period, used for informing a sending period of a measurement message, or a predetermined number of data packets to be sent during a fixed packet sending. Multicast source ID, used for recording the stream which needs to be configured and S identifies the multicast source address. Multicast group address, used for recording the stream which needs to be configured. G identifies the multicast group address. Path detection TLV, used for recording information when the path detection message passes through the node, which includes IP, ID, MEP/MIP configuration state, and a node type. Type, used for indicating that the type of the message is the configuration check message. Length, used for indicating the length of data in the message, counted in bytes.

The configuration check message in the embodiment of the present disclosure may include the following contents.

TLV offset, used for indicating the position of the TLV in the message, where the TLV is used for future expansion of functions.

TLV end mark: for indicating that the TLV ends, and if the device encounters this mark, it indicates the end of all TLVs.

The IP field in the configuration check message in the TLV format indicates the IP address of the interface. The state field is used for indicating the configuration state of the interface. Other fields in the configuration check message in the TLV format are the same as those in the path detection message in the fixed format.

TABLE 3

| Level | Version | Operation type | Sending period | TLV offset |
|---|---|---|---|---|
| | | Serial number | | |
| | | S | | |
| | | G | | |
| | | Path detection TLV1 | | |
| | | Path detection TLV2 | | |
| | | Path detection TLVn | | |
| TLV end mark | | | | |

TABLE 4

| Type | Length | Level | Version | Sending period |
|---|---|---|---|---|
| | Serial number | | | |
| | S | | | |
| | G | | | |
| | IP1 | | | State 1 |
| | IP2 | | | State 2 |
| | IPn | | | State n |

Figure 6:
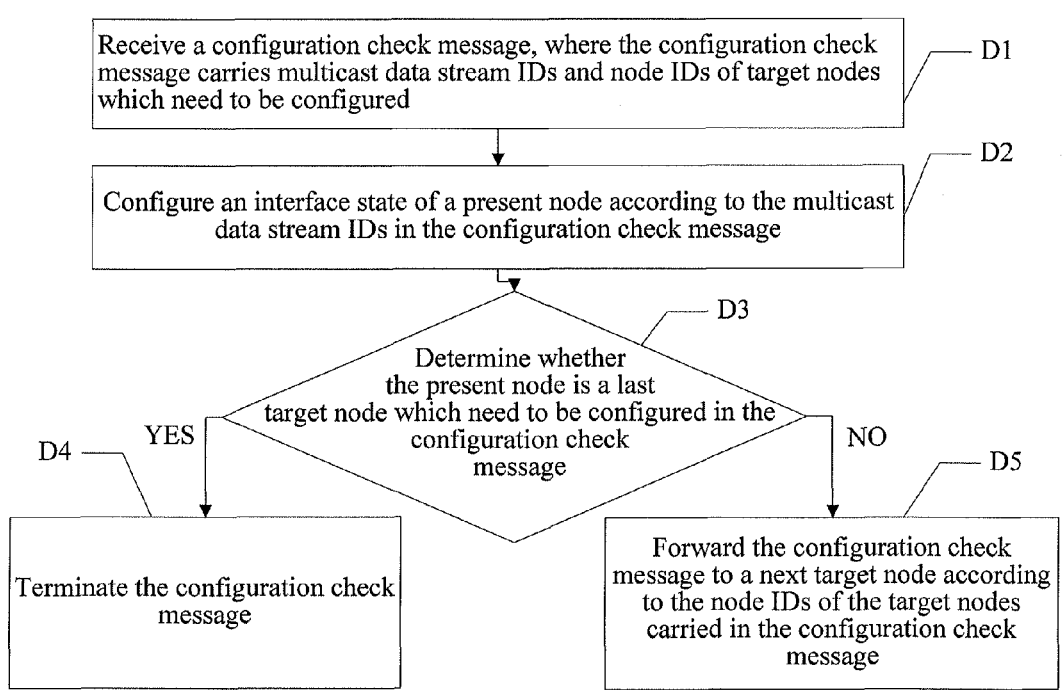
FIG. 6 is a flow chart of a second embodiment of a method for node configuration according to an embodiment of the present disclosure.

FIG. 6 is a flow chart of a second embodiment of a method for node configuration according to an embodiment of the present disclosure. Referring to FIG. 6, in the embodiment of the present disclosure, the MIP processing the configuration check message specifically includes the following steps.

Step D1: Receive a configuration check message, where the configuration check message carries a multicast data stream ID and node IDs of target nodes which need to be configured.

The MIP receives the configuration check message, where the configuration check message carries the multicast data stream ID (S, G) and node IDs of the target nodes which need to be configured, and the node IDs of the target nodes may be IP addresses of the target nodes.

Step D2: Configure an interface state of a present node according to the multicast data stream ID in the configuration check message.

The MIP configures the interface state of the present interface according to the multicast data stream ID in the configuration check message, and may configure the interface state of the preset node from NULL as an MIP directed to the multicast data stream. The MIP may also configure other parameters of the present node according to related indication information in the configuration check message, which is not limited to the configuration state information of the interface.

Step D3: Determine whether the present node is the last target node which needs to be configured in the configuration check message.

In the embodiment of the present disclosure, the MIP may determine whether the present node is the last target node which needs to be configured according to the node IDs of the target nodes need to be configured carried in the configuration check message.

It should be noted that, in the embodiment of the present disclosure, step D2 and step D3 are not subject to a time sequence, that is, the MIP may determine whether the present node is the last target node which needs to be configured in the configuration check message after receiving the configuration check message, and then perform the step of configuring the interface state of the present node (step D2).

Step D4: Terminate the configuration check message.

In the embodiment of the present disclosure, when it is determined that the present node is the last target node which needs to be configured, it indicates that the interface configuration of the MIPs has been completed, and the configuration check message is terminated.

Step D5: Forward the configuration check message to a next target node according to the node IDs of the target nodes carried in the configuration check message.

In the embodiment of the present disclosure, when it is determined that the present node is not the last target node which needs to be configured, the configuration check message is forwarded to the next target node according to the node IDs of the target nodes carried in the configuration check message, and correspondingly, the destination address of the configuration check message is changed to the IP address of the next target node.

The next target node receives the configuration check message, and continues to perform the step of configuring the interface state of the present node according to the multicast data stream ID in the configuration check message. The procedure is performed repeatedly until the last target node finishes the configuration.

The embodiment of the present disclosure sends the configuration check message to the MIP which needs to be configured, so that the MIP can automatically completes the interface state configuration of the node according to the configuration check message without any manual configuration, thereby implementing automatic configuration of functional point based on multicast paths. The method for node configuration according to the embodiment of the present disclosure may implement automatic configuration of functional point from top to bottom during large scale network deployment, and has high configuration efficiency.

In the embodiment of the present disclosure, the configuration check message may also carry the interface state of the target nodes which need to be configured, and at this time, after configuring the interface state of the present node according to the multicast data stream ID in the configuration check message, the MIP updates the interface state of the present node in the configuration check message to the configured interface state. The embodiment of the present disclosure enables the configuration check message to reflect the current interface state of the target node by updating the interface state of the target node in the configuration check message, and obtains a configuration result of the target node according to the configuration check message.

For example, in the embodiment of the present disclosure, if multiple MEP egresses are configured, the MIP may determine whether the next target node in the configuration check message is on the same network device with the present node after receiving the configuration check message, and if the next target node in the configuration check message is on the same network device with the present node, further determine whether the interface state of the next target node is NULL. If the interface state of the next target node is not NULL, it indicates that the next target node has been configured according to the configuration check message of another MEP egress, and therefore, the received configuration check message is terminated at the present node, so as to prevent repeated configuration for the target node. Definitely, if the MIP determines that the interface state of the next target node in the configuration check message is NULL, the MIP sends the configuration check message to the next target node.

The method for node configuration provided in the embodiment of the present disclosure may implement automatic configuration of the interface state of the MIP, the configuration procedure does not need manual operation, which may improve configuration efficiency and save resources especially in the case of large scale network deployment.

Figure 7:
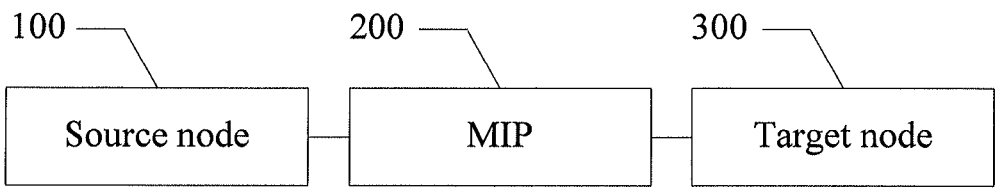
FIG. 7 is a schematic diagram of a system for path detection according to an embodiment of the present disclosure.

FIG. 7 is a schematic diagram of a system for path detection according to an embodiment of the present disclosure.

Referring to FIG. 7, the system for path detection provided in the embodiment of the present disclosure mainly comprises a source node 100, an MIP 200, and a target node 300.

The source node 100 is configured to multicast a path detection message to target nodes.

The MIP 200 is configured to receive the path detection message, write path state information of a present node into the path detection message, and forward the path detection message, into which the path state information of the present node has been written, to downstream nodes in a forwarding manner for a multicast data stream.

The target node 300 is configured to receive the path detection message, into which the path state information of the MIP has been written, and obtain a multicast path according to the path state information of the MIP.

The system for path detection provided in the embodiment of the present disclosure may be used in the corresponding embodiments of the method for path detection described above, and is not repeatedly described herein.

Figure 8:
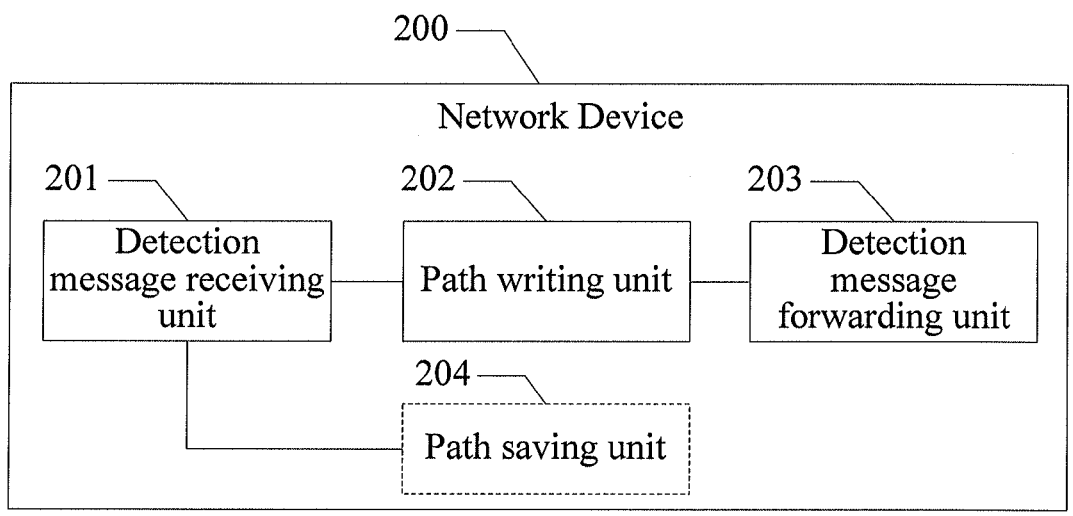
FIG. 8 is a schematic diagram of a first embodiment of a network device according to an embodiment of the present disclosure.

FIG. 8 is a schematic diagram of a first embodiment of a network device according to an embodiment of the present disclosure. Referring to FIG. 8, network device 200 in the embodiment of the present disclosure mainly comprises a detection message receiving unit 201, a path writing unit 202, and a detection message forwarding unit 203.

The detection message receiving unit 201 is configured to receive a path detection message;

The path writing unit 202 is configured to write path state information of a present node into the path detection message.

The detection message forwarding unit 203 is configured to forward the path detection message, into which the path state information of the present node has been written, to downstream nodes according to a forwarding manner for a multicast data stream.

The network device in the embodiment of the present disclosure may further include a path saving unit 204, which is configured to save the path state information carried in the received path detection message.

The first embodiment of the network device provided in the embodiment of the present disclosure may be used in the corresponding embodiments of the method for path detection described above, and is not repeatedly described herein.

Figure 9:
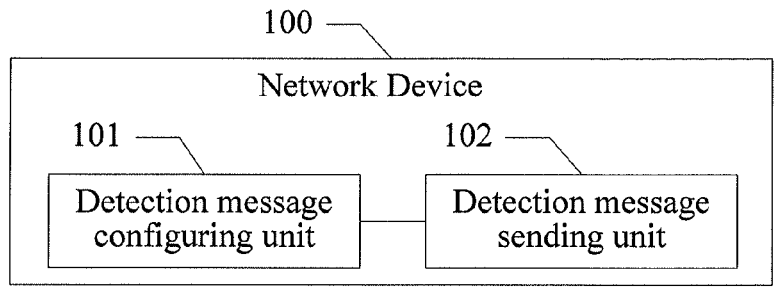
FIG. 9 is a schematic diagram of a second embodiment of a network device according to an embodiment of the present disclosure.

FIG. 9 is a schematic diagram of a second embodiment of a network device according to an embodiment of the present disclosure. Referring to FIG. 9, network device 100 in the embodiment of the present disclosure mainly comprises a detection message configuring unit 101 and a detection message sending unit 102.

The detection message configuring unit 101 is configured to configure the path detection message according to the multicast data stream which needs to be detected.

The detection message sending unit 102 is configured to multicast the path detection message to the target node.

The second embodiment of the network device provided in the present disclosure may be used in the corresponding embodiments of the method for path detection described above, and is not repeatedly described herein.

Figure 10:
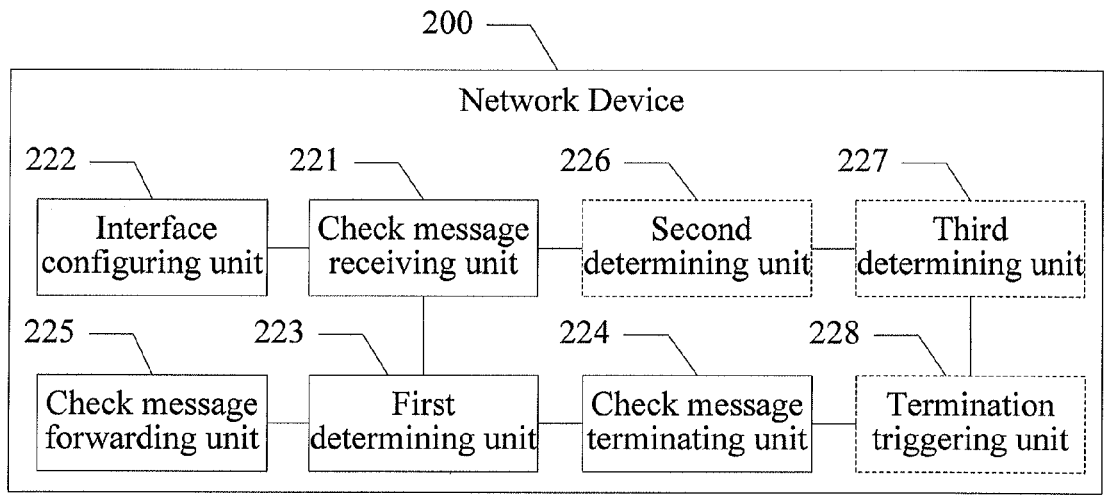
FIG. 10 is a schematic diagram of a third embodiment of a network device according to an embodiment of the present disclosure.

FIG. 10 is a schematic diagram of a third embodiment of a network device provided by an embodiment of the present disclosure. Referring to FIG. 10, the network device in the embodiment of the present disclosure mainly comprises a check message receiving unit 221, an interface configuring unit 222, a first determining unit 223, a check message terminating unit 224, and a check message sending unit 225.

The check message receiving unit 221 is configured to receive a configuration check message, where the configuration check message carries a multicast data stream ID and node IDs of target nodes which need to be configured.

The interface configuring unit 222 is configured to configure an interface state of a present node according to the multicast data stream ID in the configuration check message.

The first determining unit 223 is configured to determine whether the present node is the last target node which needs to be configured in the configuration check message.

The check message terminating unit 224 is configured to terminate the configuration check message when the first determining unit 223 determines that the present node is the last target node which needs to be configured in the configuration check message.

The check message forwarding unit 225 is configured to forward the configuration check message to a next target node according to IDs of the target nodes carried in the configuration check message when the first determining unit 223 determines that the present node is not the last target node which needs to be configured in the configuration check message.

The network device in the embodiment of the present disclosure may further include: a second determining unit 226, which is configured to determine whether the next target node in the configuration check message is on the same network device with the present node;

a third determining unit 227, which is configured to determine whether an interface state of the next target node is NULL when the second determining unit 226 determines that the next target node in the configuration check message is on the same network device with the present node;

a termination triggering unit 228, which is configured to trigger the check message terminating unit to terminate the configuration check message when the third determining unit 227 determines that the interface state of the next target node is not NULL.

The third embodiment of the network device provided in the embodiment of the present disclosure may be used in the corresponding embodiments of the method for node configuration described above, and is not repeatedly described herein.

Figure 11:
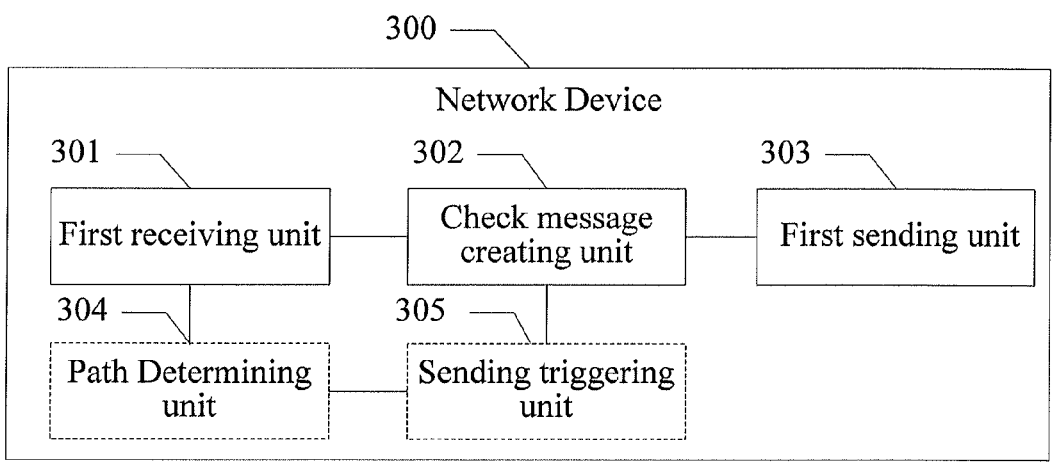
FIG. 11 is a schematic diagram of a fourth embodiment of a network device according to an embodiment of the present disclosure.

FIG. 11 is a schematic diagram of a fourth embodiment of a network device according to an embodiment of the present disclosure. Referring to FIG. 11, a network device 300 in the embodiment of the present disclosure mainly comprises a first receiving unit 301, a check message creating unit 302, and a first sending unit 303.

The first receiving unit 301 is configured to receive a path detection message.

The check message creating unit 302 is configured to create a configuration check message according to path state information carried in the path detection message, where the configuration check message carries a multicast data stream ID and node IDs of the target nodes which need to be configured.

The first sending unit 303 is configured to send the configuration check message to the target nodes which need to be configured.

The network device in the embodiment of the present disclosure may further include:

a path determining unit 304, which is configured to determine whether the path state information carried in the path detection message is the same as the locally saved path state information;

and a sending triggering unit 305, which is configured to trigger the check message creating unit 302 to create the configuration check message according to the path state information carried in the path detection message when the path determining unit 304 determines that the path state information carried in the path detection message is different from the locally saved path state information.

The fourth embodiment of the network device provided in the embodiments of the present disclosure may be used in the corresponding embodiments of the method for node configuration described above, and is not repeatedly described herein.

Persons of ordinary skill in the art should understand that all or a part of the steps of the method according to the embodiments of the present disclosure may be implemented by a program instructing relevant hardware such as a computer having a processor or any other computing devices having a processor. The program may be stored in a computer readable storage medium, such as a Read-only Memory (ROM), a Random Access Memory (RAM), a magnetic disk, or an optical disk.

The method and system for path detection, the method and network device for node configuration provided by the embodiments of the present disclosure are illustrated in detail above. The principle and implementation of the present disclosure are described herein through specific examples. The description about the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

What is claimed is:

1. A method for node configuration, comprising:
   receiving, by a network device, a path detection message;
   determining, by the network device, whether path state information carried in the path detection message is the same as locally saved path state information;
   if the path state information carried in the path detection message is different from the locally saved path state information, creating a configuration check message according to the path state information carried in the path detection message, wherein the configuration check message carries a multicast data stream identification (ID) and node ID of a target node; and
   sending, by the network device, the configuration check message to the target node.

2. A method for node configuration, comprising:
   receiving a configuration check message, wherein the configuration check message carries a multicast data stream identification (ID) and also carries node ID and interface state of a target node which needs to be configured;
   configuring an interface state of a present node according to the multicast data stream ID in the configuration check message;
   updating the interface state of the present node in the configuration check message as the interface state after configuration;
   determining whether the present node is a last target node that needs to be configured in the configuration check message, and if the present node is the last target node which needs to be configured in the configuration check message, terminating the configuration check message; and
   otherwise forwarding the configuration check message to a next target node according to the node ID of the target node carried in the configuration check message.

3. A network device, comprising:
a check message receiving unit, configured to receive a configuration check message, wherein the configuration check message carries a multicast data stream identification (ID) and node IDs of target nodes which need to be configured;
an interface configuring unit, configured to configure an interface state of a present node as a maintenance association intermediate point of a multicast data stream corresponding to the multicast data stream ID in the configuration check message;
a first determining unit, configured to determine whether the present node is a last target node which needs to be configured in the configuration check message;
a check message terminating unit, configured to terminate the configuration check message when the determining unit determines that the present node is the last target node which needs to be configured in the configuration check message; and
a check message forwarding unit, configured to forward the configuration check message to a next target node according to IDs of the target nodes carried in the configuration check message when the determining unit determines that the present node is not the last target node which needs to be configured in the configuration check message.

4. A network device, comprising a first receiving unit, a check message creating unit, a first sending unit, a path determining unit and a sending triggering unit, wherein:
the first receiving unit is configured to receive a path detection message;
the path determining unit is configured to determine whether the path state information carried in the path detection message is the same as locally saved path state information;
the sending triggering unit is configured to trigger the check message creating unit to create the configuration check message according to the path state information carried in the path detection message when the path determining unit determines that the path state information carried in the path detection message is different from the locally saved path state information;
the check message creating unit is configured to create a configuration check message according to path state information carried in the path detection message, wherein the configuration check message carries a multicast data stream identification (ID) and node IDs of target nodes which need to be configured; and
a first sending unit is configured to send the configuration check message to the target nodes which need to be configured.

5. A method for node configuration, comprising:
receiving, by a network device, a configuration check message, wherein the configuration check message carries a multicast data stream identification (ID) and node ID of target node that needs to be configured;
configuring, by the network device, an interface state as a maintenance association intermediate point of a multicast data stream corresponding to the multicast data stream ID in the configuration check message;
determining, by the network device, whether a present node is a last target node that needs to be configured in the configuration check message, and if the present node is the last target node that needs to be configured in the configuration check message, terminating the configuration check message; and
otherwise forwarding, by the network device, the configuration check message to a next target node according to the node ID of the target node carried in the configuration check message.

6. A method for node configuration, comprising:
receiving, by a network device, a configuration check message, wherein the configuration check message carries a multicast data stream identification (ID) and node ID of target node which needs to be configured;
configuring, by the network device, an interface state of a present node according to the multicast data stream ID in the configuration check message;
determining, by the network device, whether the present node is a last target node that needs to be configured in the configuration check message, and if the present node is the last target node which needs to be configured in the configuration check message, terminating the configuration check message; and
otherwise determining, by the network device, whether a next target node in the configuration check message is on a same network device with the present node; if the next target node in the configuration check message is on the same network device with the present node, determining whether an interface state of the next target node is NULL; and if the interface state of the next target node is NULL, performing the step of forwarding the configuration check message to the next target node according to the node ID of the target node carried in the configuration check message.

7. A network device, comprising:
a check message receiving unit, configured to receive a configuration check message, wherein the configuration check message carries a multicast data stream identification (ID) and node IDs of target nodes which need to be configured;
an interface configuring unit, configured to configure an interface state of a present node according to the multicast data stream ID in the configuration check message;
a first determining unit, configured to determine whether the present node is a last target node which needs to be configured in the configuration check message;
a check message terminating unit, configured to terminate the configuration check message when the determining unit determines that the present node is the last target node which needs to be configured in the configuration check message;
a second determining unit, configured to determine whether a next target node in the configuration check message is on a same network device with the present node;
a third determining unit, configured to determine whether an interface state of the next target node is null when the second determining unit determines that the next target node in the configuration check message is on the same network device with the present node;
a termination triggering unit, configured to trigger the check message terminating unit to terminate the configuration check message when the third determining unit determines that the interface state of the next target node is not null; and a check message forwarding unit, configured to forward the configuration check message to the next target node according to IDs of the target nodes carried in the configuration check message when the determining unit determines that the present node is not the last target node which needs to be configured in the configuration check message and the third determining unit determines that the interface state of the next target node is null.

\* \* \* \* \*